United States Patent [19]

Bennett et al.

[11] 4,165,282

[45] Aug. 21, 1979

[54] OIL RECOVERY METHOD AND APPARATUS

[75] Inventors: John A. Bennett, West Vancouver; Ian R. McAllister, Vancouver; Howard Welsh, North Vancouver, all of Canada

[73] Assignee: Bennett Pollution Controls Ltd., North Vancouver, Canada

[21] Appl. No.: 857,513

[22] Filed: Dec. 5, 1977

Related U.S. Application Data

[60] Division of Ser. No. 661,769, Feb. 26, 1976, Pat. No. 4,061,569, and a continuation-in-part of Ser. No. 567,426, Apr. 11, 1975, abandoned, which is a continuation of Ser. No. 464,540, Apr. 26, 1974, abandoned.

[51] Int. Cl.² .................................... F02B 15/04
[52] U.S. Cl. ........................ 210/40; 210/DIG. 26; 210/212 S; 210/400
[58] Field of Search .............. 210/DIG. 25, DIG. 26, 210/242, 39, 40, 41, 400

[56] References Cited

U.S. PATENT DOCUMENTS

| | | | |
|---|---|---|---|
| 2,470,418 | 5/1949 | Verner | 210/DIG. 26 |
| 3,487,927 | 1/1970 | Yahntie | 210/DIG. 26 |
| 3,617,552 | 3/1970 | Will | 210/DIG. 26 |
| 3,617,556 | 11/1971 | Cole et al. | 210/DIG. 26 |
| 3,640,394 | 2/1972 | Brill et al. | 210/DIG. 26 |
| 3,679,058 | 7/1972 | Smith | 210/DIG. 26 |
| 3,700,593 | 10/1972 | Bezemer et al. | 210/DIG. 26 |
| 3,752,762 | 8/1973 | Cincotta | 210/DIG. 26 |
| 3,846,335 | 11/1974 | Bunn | 210/DIG. 26 |
| 3,890,234 | 6/1975 | Galicia | 210/DIG. 25 |
| 4,061,569 | 12/1977 | Bennett et al. | 210/DIG. 25 |

Primary Examiner—Theodore A. Granger

[57] ABSTRACT

An oil recovery device having a downwardly and rearwardly traveling oil absorbing belt, to pick up oil on a body of water. The belt travels around an upwardly and forwardly positioned drum to be engaged by a porous squeeze belt to remove the oil from the oil absorbing belt. Rearwardly of the belt is an oil collecting enclosure to collect oil not recovered by the oil absorbing belt. The device has a downwardly and rearwardly inclined bow ramp over which an oil/water liquid passes into a through passage in the device, and water having oil separated therefrom passes out longitudinally spaced bottom openings, with the flow through these openings being controlled by closure doors.

2 Claims, 11 Drawing Figures

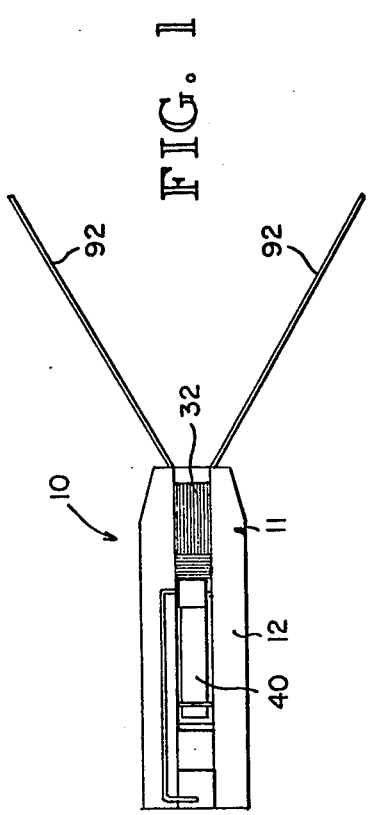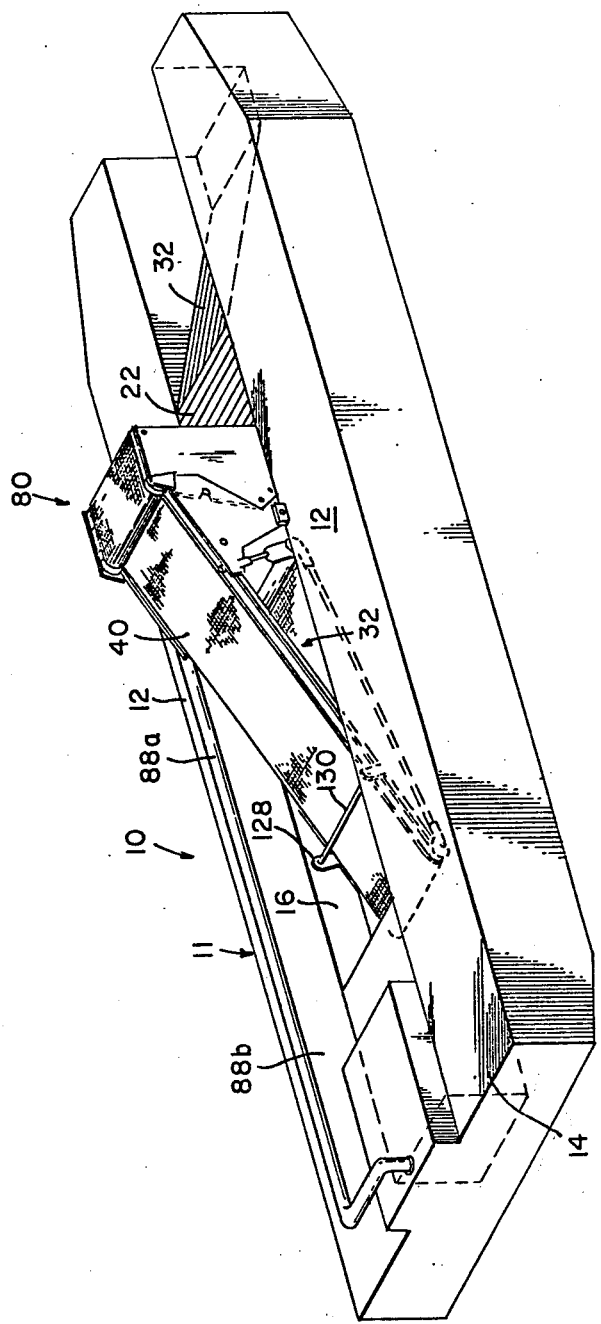

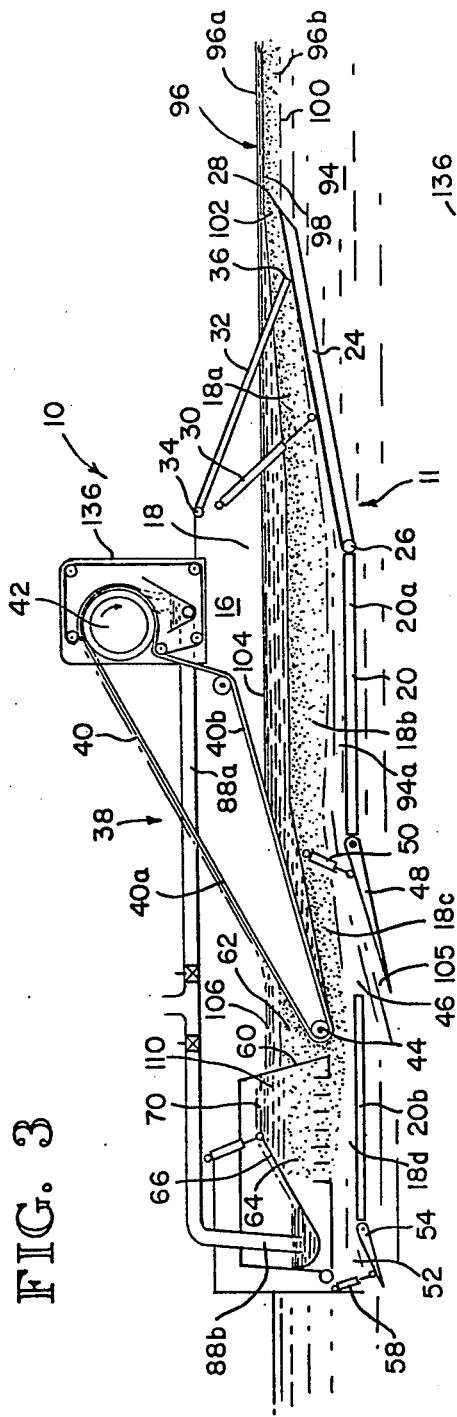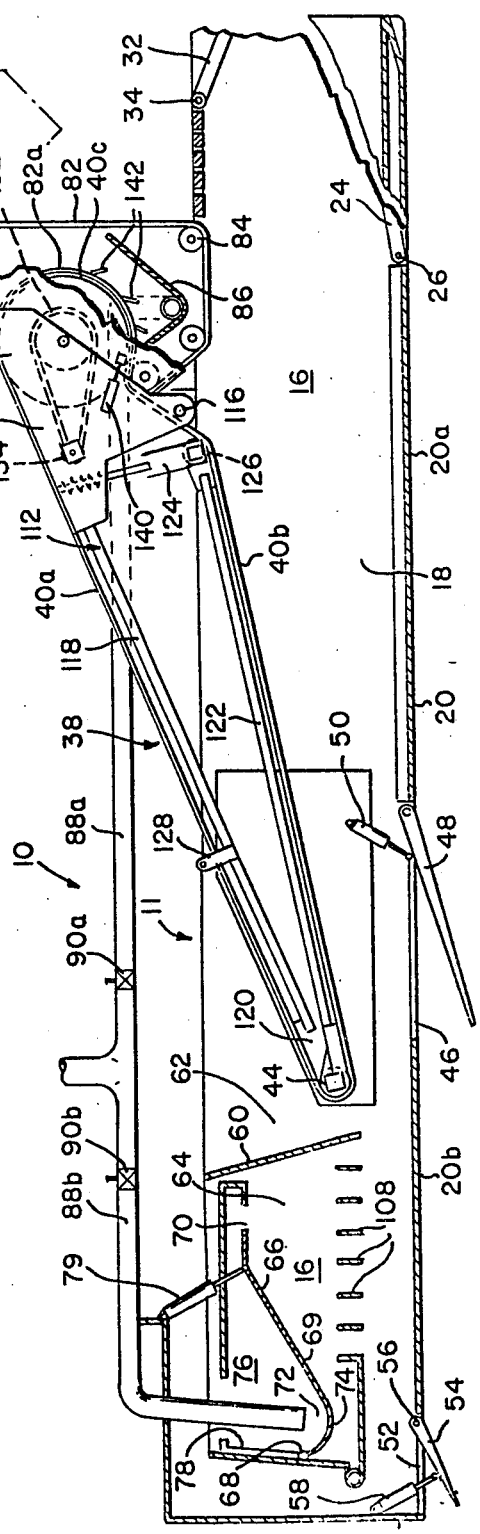

FIG. 5
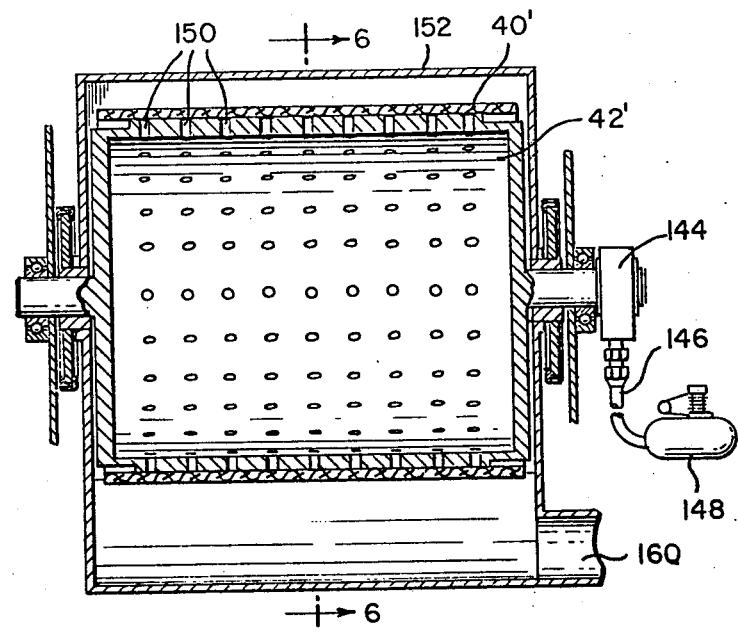
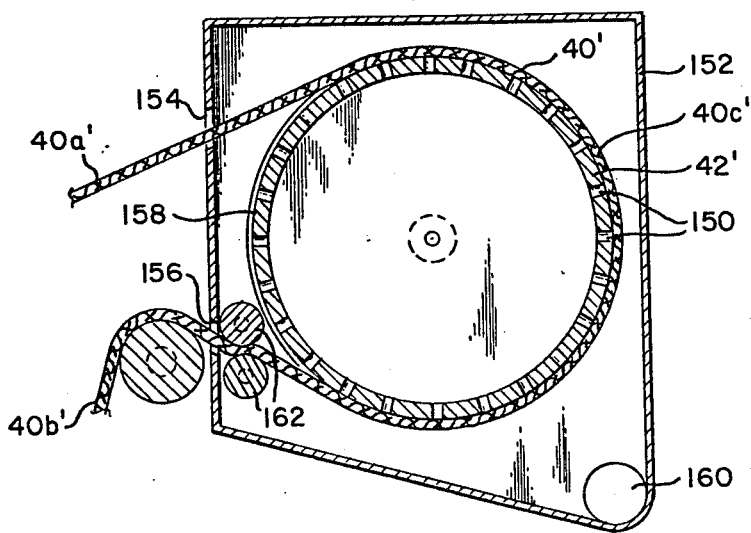
FIG. 6

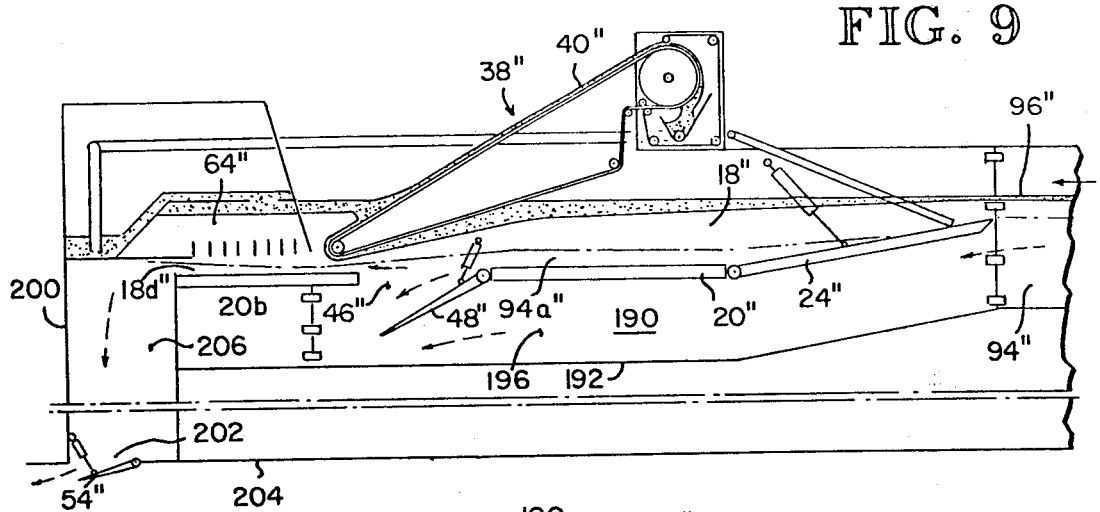
FIG. 9
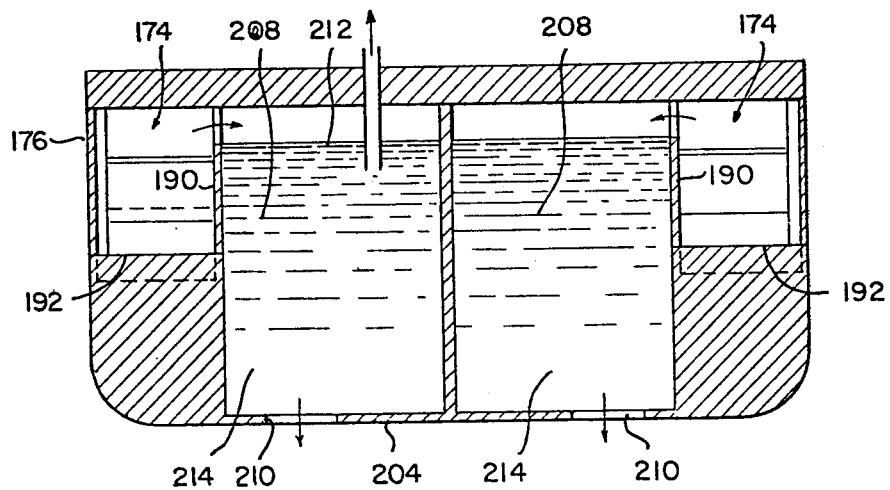
FIG. 10
FIG. 11

OIL RECOVERY METHOD AND APPARATUS

CROSS REFERENCE TO RELATED APPLICATIONS abandoned,

This is a division of application Ser. No. 661,769, filed Feb. 26, 1976, now U.S. Pat. No. 4,061,569, issued Dec. 6, 1977, and a continuation-in-part of our previous application entitled OIL RECOVERY APPARATUS, Ser. No. 567,426, filed Apr. 11, 1975, now abandoned, which is a continuation of original application entitled OIL RECOVERY APPARATUS, Ser. No. 464,540, filed Apr. 26, 1974, now abandoned.

BACKGROUND OF THE INVENTION

1. Field of the Invention

The present invention relates generally to oil recovery apparatus, such as that used in collecting oil resulting from oil spills in harbors or other bodies of water, and to a method for recovering such oil.

2. Description of the Prior Art

In the prior art, there are various oil recovery devices, often called "skimmers," which remove oil from a water surface. A good number of these devices utilize an oleophillic material, usually in the form of a continuously traveling belt, to pick up oil from the water surface and carry it to a removal location where scrapers or rollers are used to remove oil from the belt.

Other devices depend upon the tendency of oil to float to the surface of a body of water to accomplish separation of oil from the body of water. If such devices, the oil polluted surface layer, generally a mixture of water and oil, is directed into some type of reservoir where the liquid is relatively undisturbed to permit the oil to separate by floatation. In some instances the oil/water liquid is "skimmed" from the surface portion of the body of liquid. In other instances, the oil/water surface liquid is directed on a downwardly slanting path to a reservoir, after which the oil separates by floatation.

While such devices have the capability of removing a certain percentage of oil from a water surface, there is still a continuing need for more effective collection and separation of oil from an oil polluted body of water. This is particularly true in view of the fact that quite often the recovery of oil must be accomplished under less than ideal weather conditions, where there is a certain amount of wave action which tends to complicate the separation of the oil from the water.

Accordingly, it is a principal object of the present invention to provide a method and apparatus for collection of oil from a body of water, where the efficiency of operation is relatively high, and where there is a capability of effective operation under varying conditions of operation.

SUMMARY OF THE INVENTION

When oil is spilled on a body of water, the polluting oil tends to rise to the surface of the body of water. However, wave action and other sources of turbulence causes some of this oil to become mixed with the water, so that the oil polluted surface layer can be considered as having an upper surface layer portion of a relatively high oil content and a second lower surface portion of an oil/water mixture of relatively less oil content. While there is usually no sharply defined separation between the oil polluted surface layer and the underlying body of water, nor any sharp deliniation between the upper and lower polluted surface layer portions, there is a gradation of oil density which provides a basis for making a distinction in these layers or zones in an oil polluted surface layer.

In the method of the present invention, the oil polluted surface layer is directed at a first velocity through a forwardly located passageway inlet of a first predetermined cross sectional area and depth, which inlet has an inlet defining lower edge at approximately the depth of the polluted surface layer, so as to separate this layer from the underlying body of water. The polluted surface layer is then moved rearwardly through an enlarged passageway section having a cross sectional flow area and depth substantially greater than that of the inlet. This results in a substantial reduction in flow velocity and a substantial increase in depth of at least the upper surface layer portion, and also serves to create a third lowermost layer of relatively oil free water by virtue of an upward migration of oil in the second lower surface layer portion into the upper surface layer portion.

The first and second layer portions are directed from the enlarged passageway section into a first stage oil removal area where a substantial portion of the oil in the upper layer portion is removed therefrom by engaging the upper layer portion with a downwardly and rearwardly traveling oil absorptive belt that travels continuously from an upper forward location at a downward slant to a rearward location below the liquid surface level. The collected oil is removed from the belt at a location separate from the flow area of the oil polluted layer.

Also, at least a substantial portion of the third relatively oil free layer portion that is formed in the enlarged passageway section is diverted from the flow path of the polluted surface layer portions and discharged back into the underlying body of water. The remaining flow, which is made up largely of the second lower surface portion is directed through a second oil recovery area to cause oil to separate by floatation from the remaining liquid flow, and confining the oil so collected in this second recovery area for separation of the oil from the oil/water mixture. The remaining liquid flow, with oil having been removed therefrom in the first and second recovery areas, is then discharged back to the body of water.

In the preferred form, the method of the present invention is practiced by directing the flow of the oil polluted surface layer through a passageway defined by a floating vessel. The flow is initially directed over the front edge of a downwardly and rearwardly sloping bow ramp of the vessel into the enlarged passageway section. At the location of the first collecting area, the third lower relatively oil free lower portion formed in the enlarged passageway section is diverted through a bottom opening which opens downwardly into the underlying body of water, and the flow through this opening is controlled by a forwardly hinged gill door. The flow of relatively oil free liquid from the second collecting area is directed through a rear opening, and the flow is controlled by a second rear gill door to be discharged back to the body of water. By selectively positioning the bow ramp and the two gill doors, relative to the position of the oil recovery belt, the flow of the liquid layer portions can be properly controlled to effect oil removal with relatively high efficiency.

In accordance with another facet of the present invention, oil is removed from the oil absorbing belt by engaging the oil recovery belt with a squeeze belt which presses the oil recovery belt against a portion of the circumferential surface of a head roll over which the oil absorbing belt travels. As a modification a pressurized gaseous medium, such as steam, is directed into the interior of the head roll to pass out openings therein to pass through the oil recovery belt as it travels around the head roll to remove oil therefrom.

The oil collecting apparatus of a first embodiment of the present invention comprises a hull adapted to be positioned at the surface of a body of water and having side walls and a bottom wall defining a passageway through which the oil polluted surface layer passes. Mounted to the forward end of the hull is a bow ramp positioned between the forward end of the side walls and defining with the side walls a front inlet for the polluted surface layer. The bow ramp is vertically adjustable to define an inlet of a predetermined depth and cross sectional area.

Rearwardly of the bow ramp, the side and bottom walls define an enlarged passageway section having a depth and cross sectional area substantially greater than those of the inlet. Located rearwardly of the enlarged passageway section is a first oil recovery area where there is located a first oil recovery means, comprising an oil absorbing belt having a downwardly and rearwardly traveling lower run that extends into the surface layer at a rearward slant. This belt absorbs at least a substantial portion of the oil in the upper surface layer portion.

To remove the oil collected in the oil absorbing belt, in the preferred form, there is a porous squeeze belt which engages the oil absorbing belt at it travels around the outer circumferential surface of a forwardly and upwardly positioned head roll. The oil passes from the oil collecting belt through openings in the squeeze belt to be removed therefrom by suitable means, such as a scraper. In a modified form, the head roll is made with openings, and there is means to inlet a pressurized gaseous medium, such as steam, into the head roll to pass through the oil absorbing belt to remove the oil therefrom.

At the location of the first oil collecting area, there is means defining in the bottom wall a main opening positioned rearwardly of the enlarged passageway section. Water which forms as a relatively oil free third lower layer in the enlarged passageway section passes from the enlarged passageway section through this opening.

Rearwardly of the first oil collecting area, the hull defines a rear passageway section to receive the flow of liquid which remains from the first recovery area. There is a second oil recovery means above the rear passageway section, this second oil recovery means comprising an enclosure means having a bottom opening to receive oil that floats upwardly from liquid passing through the rear passageway section. Downstream of the rear passageway section there is means defining a rear opening leading from the rear passageway section to direct liquid therefrom back to the body of water.

In the preferred form, there are provided for both the main opening and the rear opening gill doors which are selectively operable to various positions. By selectively controlling the relative positions of the two gill doors, the main bow ramp and the height of the oil absorbing belt, relative to the condition of the oil polluted surface layer, the oil collecting ability of the apparatus can be optimized. Further, in the second oil recovery area there is vertically adjustable weir means to separate oil from the water in the second recovery means.

In a further embodiment, two oil recovery devices, similar to the first embodiment are mounted on opposite sides of the hull of a patrol vessel adapted for efficient travel at cruising speeds. Front and rear side opening doors can be selectively operated to direct oil polluted water that passes by the bow of the hull to flow through the oil recovery devices.

Other features of the present invention will become apparent from the following description.

BRIEF DESCRIPTION OF THE DRAWINGS

FIG. 1 is a top plan view of the apparatus of a first embodiment of the present invention;

FIG. 2 is an isometric view thereof;

FIG. 3 is a semi-schematic longitudinal sectional view illustrating the process of the present invention as accomplished by the first embodiment of the apparatus of the present invention;

FIG. 4 is a second longitudinal sectional view of the apparatus of the first embodiment illustrating the components of the apparatus in more detail;

FIG. 5 is a sectional view of a modified form of the head roll of the apparatus of the first embodiment, said section being taken along the axis of rotation of the head roll;

FIG. 6 is a sectional view taken along line 6—6 of FIG. 5;

FIG. 9 is a side elevational view of the oil removal device shown in FIG. 8;

FIG. 10 is a top plan view of the device shown in FIGS. 8 and 9; and

FIG. 11 is a sectional view taken through the center line of the vessel shown in FIG. 7 at the location of its oil collecting devices.

DESCRIPTION OF THE PREFERRED EMBODIMENTS

Figure 7:
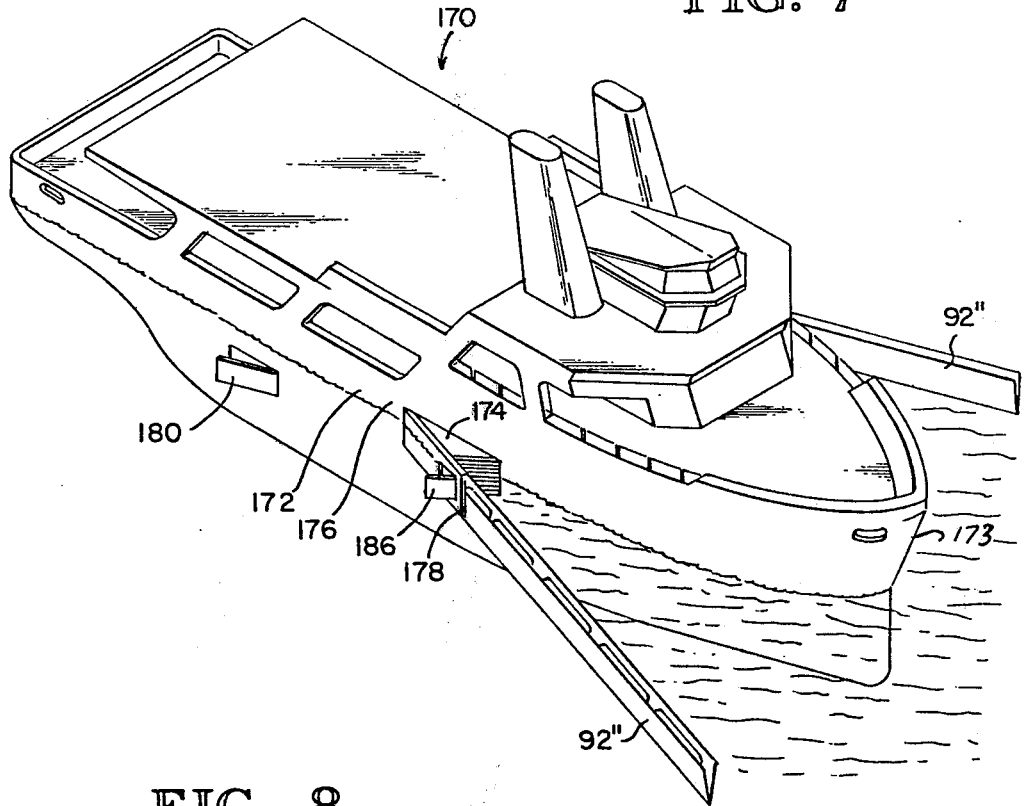
FIG. 7 is an isometric view of a second embodiment of the apparatus of the present invention.

It is believed that a clearer understanding of the present invention will be achieved by initially describing the main components of the apparatus of the first embodiment of the present invention and then describing how these components function to accomplish the operation of the process of the present invention. Subsequent to this, certain components of the first embodiment of the apparatus will be described in more detail, after which second and third embodiments of the apparatus of the present invention will be described.

As illustrated in FIG. 1, the first embodiment of the apparatus of the present invention is designated 10 and comprises a hull 11 having a generally U-shaped configuration made up of two side sections 12 and a rear portion 14 connecting the side portions 12 at the rear ends thereof. The two hull side sections 12 each have an inwardly facing vertical parallel side wall 16, with these two side walls 16 defining a longitudinal flow passage 18. Extending between the bottom edges of the two side walls 16 is a horizontal bottom wall 20 which defines the bottom side of a major portion of the passageway 18. Deck sections 22 extend between forward and rear portions of the hull side sections 12.

Mounted between the forward end of the two hull side sections 12 is a bow ramp 24 which is pivotally mounted by its rear end at 26 to the front edge of the bottom wall 20. The ramp 24 is generally planar and has the shape of a rectangle, the sides of which fit closely against the hull side walls 16. The front end 28 of the ramp 24 is vertically adjustable from its rear pivot mounting 26 by means of a pair of hydraulic jacks 30. A trash rack 32 is positioned above the bow ramp in a manner to extend in a downward and forward direction from an upper rear pivot point 34. The forward end 36 of the trash rack 32 rests against the upper surface of the forward end 28 of the bow ramp 24. This trash rack 32 is made up of a plurality of laterally spaced, longitudinally extending bars which collect floating debris entering the passageway 18.

A first stage oil recovery device 38 is positioned rearwardly of the bow ramp 24 and the trash rack 32 at the longitudinal center line of the hull 10. This first stage recovery device 38 removes oil from the liquid flowing through the passageway 18 by absorption, and comprises a continuously rotating belt 40 made of a suitable oil absorbing material such as open-cell polyurethane foam attached to a suitable high strength backing material. The belt 40 travels around a forward and upwardly positioned head roll 42 and a rear lower end roll 44, with the belt 40 thus having an upper forwardly traveling belt run 40a and a lower rearwardly and downwardly traveling belt run 40b. The side edges of the belt 40 are in close proximity to the side walls 16 so that the belt 40 extends substantially entirely across the passageway 18.

A main bottom opening 46 is provided in the bottom wall 20 at a location near the rear portion of the lower belt run 40b, thus separating the bottom wall 20 into forward and rear portions 20a and 20b, respectively. Pivotally mounted to the bottom wall 20 at the forward edge of the bottom opening 46 is a closure door 48 which is swung upwardly and downwardly from its forward pivot point by a pair of hydraulic jacks 50. The door 48 can be moved upwardly to close the bottom opening 46, and can also be swung downwardly to the desired degree to permit a portion of the liquid flow in the passage 18 to pass downwardly and through the bottom opening 46. When the door 48 is moved down to an open position in the oil collecting operation of the apparatus 10, it functions in the manner of a valve or a "main gill" to control the diversion of liquid flow from the passage 18. The significance of this particular function will be described more fully hereinafter where the operation of this apparatus is disclosed in more detail.

At the extreme rear end of the bottom wall 20, there is a rear opening 52. This rear opening 52 also is provided with a closure door 54 pivotally mounted at 56 to the bottom wall 20 at the forward edge of the opening 52. Hydraulic jacks 58 are provided to move this rear door 54 between an upper closed position and a lower open position. As will be described more fully hereinafter, this rear door 54 is able to operate as a valve or "rear gill" to control flow through the rear end of the passageway 18.

Positioned just behind the rear end of the oil recovery belt 40 is a wall or cowling 60 which reaches between the two side walls 16 to define a first enclosure area 62 that functions as an oil pickup augmenting area. While the function of this cowling wall 60 will be described more fully hereinafter, it can be stated briefly that the wall 62 functions to concentrate a portion of the oil which passes upwardly at a location immediately rearwardly of the belt 40, to enhance or augment the pickup function of the belt 40 in this area so that the oil more readily is carried on the upward forwardly traveling run 40a to the forward removal area of the belt 40.

Rearwardly of the enclosure area 62 there is an enclosed oil recovery area 64. This area 64 is defined at its forward end by the cowling wall 60, by the two side wall portions 16 that extend rearwardly from the cowling wall 60, and at its rear end and upper portions by a movable weir 66. This weir 66 is pivotally mounted at its rear end at 68 and comprises lower wall means 69 that extends upwardly and forwardly over the recovery area 64. At the upper forward end of the wall 69 is an opening 70 by which collected oil can flow through the wall 69 and be collected in a reservoir 72 defined by the lower bottom wall portion 74, side walls 76, and by a vertical rear wall 78 of the weir 66. Hydraulic jacks 79 are provided to move the weir 66 downwardly or upwardly to cause collected oil to pass from the recovery area 64 through the opening 70 and into the reservoir 72.

At the location of the head roll 42 there is an oil removal device 80 by which oil that is collected by the lower belt run 40b and carried upwardly and forwardly by the upper belt run 40a is removed from the belt 40. This oil removal device 80 comprises a porous or foraminous squeeze belt 82 mounted to a plurality of rolls 84. While the mode of operation of the squeeze belt 82 will be described more fully hereinafter, it can be stated briefly that the squeeze belt 82 engages the belt portion 40c of the oil recovery belt 40 which travels around the cylindrical circumference of the head roll 42 to remove oil therefrom. The oil removed from the squeeze belt 82 is collected in a trough 86. Conduits 88a and 88b lead from the trough 86 and the reservoir 72, respectively, to remove the collected oil to a main storage area. Valves 90a and 90b are provided in the conduits 88a and 88b, respectively, to control the relative flow through these conduits 88a and 88b in accordance with the rates of recovery in the reservoir 72 and the trough 86.

With the main components of the apparatus of the first embodiment having now been disclosed, the method of the present invention will now be described.

In cruise conditions, the bow ramp 24 of the apparatus 10 is moved upwardly so that its forward end 28 is above the water surface, and the two gill doors 48 and 54 are closed so that the passage 18 between the hull sections 12 is substantially closed off. In this condition, the apparatus 10 is able to travel through the water 94 without encountering the drag created by water flowing through the passageway 18. To give added buoyancy to the apparatus 10, one or both of the gill doors 48 and 54 can be open slightly to create an aspirating effect due to the relative motion of the apparatus 10 and the body of water 94 to actually reduce the level of water within the passageway 18.

Let it be assumed that there is an oil spill in a body of water, such as an ocean harbor. The oil recovery apparatus 10 moves into the area of the spill either under its own power or by power from another source. Usually, some means such as the collecting boom 92 shown in FIG. 1 is used to concentrate the oil on the water surface and direct it into the area immediately forward of the recovery apparatus 10 for flow into the passageway 18 of the apparatus 10. As shown in FIG. 1, the boom 92 comprises right and left sections which diverge outwardly and forwardly from the forward end of the apparatus 10.

Reference is now made to FIG. 3, where the oil recovery apparatus 10 is shown floating in the body of water 94 and the oil to be collected from the surface area of this water is generally designated 96 and can be seen to comprise an upper layer portion 96a of relatively high oil content and a second lower layer portion 96b of an oil/water mixture of relatively less oil content. In can be appreciated that the body of water 94 will seldom be completely tranquil, so that there will be a certain amount of wave action which tends to mix the surface oil with the water beneath. Thus, the dividing line 98 (more precisely dividing plane) between the upper and lower surface portions 96a and 96b is not a clearly delineated plane, nor is the lower limit 100 of the lower oil surface layer portion 96b clearly delineated. However, for purposes of describing the method of the present invention, these two defining planes 98 and 100 can be considered as reasonably ascertainable.

As the apparatus 10 encounters the oil polluted surface layer 96, the bow ramp 24 is lowered to its "skimming" condition so that the forward edge 28 of the bow ramp 24 is at or just below the lower planar limit 100 of the lower layer portion 96b. Thus, the bow ramp forward end 28 and the forward ends of the side walls 16 define a front passageway inlet 102 of a predetermined cross sectional area. With the bow ramp 24 in its skimming position so that it has a moderate downward and rearward slope, it can be seen that the forward end 18a of the passageway 18, which is defined by the ramp 24 and the adjacent portions of the side walls 16, increases in cross sectional area and in depth. The next section 18b of the passageway 18, located immediately rearwardly of the section 18a, is defined by the forward bottom wall section 20a and adjoining portions of the side walls 16, and can be seen to have a substantially uniform cross sectional area substantially larger than that of the inlet 102.

As the oil polluted layer 96 flows from the inlet 102 through the initial passageway portion 18a, its velocity decreases in proportion to the increase in cross sectional flow area of the front passageway portion 18a. Also, both of the layer portions 96a and 96b increase in thickness. Further, with the decrease in velocity and with a decrease in the turbulence of the water as it moves more slowly down the forward passageway portion 18a, oil in the lower surface portion 96b begins to migrate upwardly and become part of the upper oil surface portion 96a. As the flow continues through the passageway section 18b, this upward migration of oil particles in the lower surface portion 96b continues, so that there is a formation of a third lowermost layer of relatively oil free water, this layer being designated 94a.

At the rear of the second passageway portion 18b, the lower run 40b of the collecting belt 40 engages the liquid surface and slants downwardly and rearwardly at a moderate slope (e.g., 15° from the horizontal) so that the extreme rear end of the lower belt run 40b is moderately below the normal liquid surface, designated 104. The lower rear portion of the belt 40b which engages the polluted surface layer 96 is positioned above the main bottom opening 46. The main gill door 48 is moved from its upper closed position downwardly to a position to define an exit opening 105 of a cross sectional area sufficient to permit an outflow of the lower water layer 94a that forms in the two forward passageway sections 18a and 18b.

At the same time, the oil in the upper layer portion 96a is engaged by the lower belt run 40b so as to be absorbed therein. This absorbed oil is carried by the upper belt run 40b to the first oil removal device 80 where the squeeze belt 82 engages the belt section 40c around the head roll 42. The oil squeezed from the belt section 40c passes through the openings in the squeeze belt 82 and collects on the outside surface thereof to be collected in the trough 86. This passageway portion between the main bottom opening 46 and the rear lower recovery belt portion 40b is designated 18c. It can be seen from an examination of FIG. 3 that in this passageway area 18c, the upper oil polluted surface portion 96a is largely absorbed into the recovery belt 40 and the lower water layer 94a is largely diverted through the bottom opening 46. The level of the lower belt run 40b and the height of the main gill door 48 can be adjusted relative to each other to maintain the desired separation of the lower oil surface portion 96b and the water portion 104.

A fourth passageway portion 18d is located rearwardly of the rear end of the oil collecting belt 40 and is defined by the rear bottom wall portion 20b and adjoining portions of the side walls 16. It can be seen from FIG. 3 that with the upper oil layer surface portion 96a being largely absorbed by the belt 40 and with the major portion of the lower water layer 94a passing through the main bottom opening 46 (i.e., the "main gill" opening) the liquid flowing into the fourth passageway portion 18d is made up predominantly of the second lower oil surface portion 96b. As indicated previously, the layer 96b is essentially an oil/water mixture, with particles of oil being suspended in the water.

Immediately forward of the cowling wall 60 and rearwardly of the oil collecting belt 40 is the first enclosure area 62. At least part of the upper oil surface portion 96a that may not be absorbed by the belt 40 tends to float upwardly into this enclosure area 62 and remain floating in that area, as indicated at 106, where it is able to come into contact with the upper belt run 40a to be carried forwardly to the oil removal device 80. The oil/water liquid 96b which flows beneath the cowling wall 60 passes beneath the second enclosure area 64, and the oil suspended in this liquid flow 96b tends to migrate upwardly to collect at the top end of the second enclosure 64. To enhance the upward migration of oil particles, the enclosure area immediately above the passageway portion 18d can be provided with a plurality of vertically aligned transverse baffles, indicated at 108, which are spaced above and along the passageway portion 18d.

As oil collects at 110 at the upper part of the recovery area 64, this oil flows through the weir opening 70 and collects in the reservoir 72. The hydraulic jacks 79 are able to move the weir 66 downwardly or upwardly to clear the recovery area 64 of oil and limit the flow of water through the opening 70.

To continue with the description of the apparatus of the present invention, the head roll 42 and the end roll 44 around which the oil absorbing belt 40 travels are mounted to a suitable frame 112. This frame 112 comprises two forwardly positioned side plates 114 interconnected to one another by suitable cross members and pivotally mounted at 116 to the hull 11. Fixedly connected to and extending rearwardly from the side plates 42 is a rear upper frame section 118 made up of a plurality of longitudinal tubes which are connected by suitable cross braces. At the rear of the frame 118 there is a pair of rear side plates 120 between which extends an axle to which the aforementioned rear end roll 44 is mounted.

A lower frame section 122 is pivotally mounted from the side plates 120 and extends forwardly therefrom to a location behind the pivot mounting 116, where it connects to a lower end of a pair of spring loaded struts 124, which in turn are connected at their upper ends to the side plates 114. A tension roll 126 is mounted to the forward end of the frame section 122. The upper frame section 118 is located just beneath the upper return run 40a of the belt 40, while the lower frame section 122 is positioned just above the lower oil absorbing run 40b of the belt 40.

At the rear portion of the upper frame section 118, there is a pair of upstanding brackets 128 between which is mounted a cross bar 130 by which the rear portion of the belt and frame assembly 40 and 112 can be raised or lowered with respect to the water surface by rotation about the forward mounting axis 116. The belt 40 is caused to travel its closed path by transmitting power to the head roll 42 by means of a suitable chain and sprocket drive, indicated at 132, which in turn is powered by suitable means such as the motor indicated at 134.

The aforementioned oil removal device 80 with its associated squeeze belt 82 is mounted generally forwardly of the head roll 42 with the squeeze belt 82 being mounted to the rolls 84 which are in turn mounted to a frame 136 pivotally mounted at the location of an upwardly located roll 84. For convenience of illustration, this frame 136 is shown only in broken lines in FIG. 4 in its raised position.

One of the rolls 84 is a drive roll and is powered by suitable means, such as a hydraulic motor. The rolls 84 are so positioned that the squeeze belt 86 extends from an upper roll 84 and curves in approximately a 180° arc to press against that portion 40c of the oil absorbing belt 40 that engages the forward circumferential surface of the head roll 42. That portion of the squeeze belt 82 which engages the belt section 40c is designated 82a. So that the squeeze belt section 82a engages the oil recovery belt removal section 40c with adequate pressure to accomplish the removal function, there is provided a pair of hydraulic squeeze jacks 140, each of which is pivotally mounted by one end to a related side plate 114 and by the other end to the frame 136. By disconnecting the jacks 140 from the frame 136, the frame 136 can be swung upwardly to the position indicated in dotted lines in FIG. 4.

At the exposed surface of the squeeze belt section 82a, there is provided a plurality of scrapers 142 at the lower portion of the squeeze belt section 82a to remove oil that flows from the oil absorbing belt section 80c and through the squeeze belt section 82a. The aforementioned collection trough 86 is positioned below the scrapers 142.

In operation, the oil absorbed in the belt 40 is carried by the upper belt run 40a to the location of the squeeze belt 82. The squeeze belt 82 engages the oil absorbing belt section 40c about the 180° arc with substantially uniform squeeze pressure throughout the entire area of contact. As the oil absorbing belt 40 passes through the contact area of the belt 40c, oil is effectively removed therefrom and the belt does not experience any significant lengthwise deformation.

In FIGS. 5 and 6, there is shown a second embodiment of the oil removal device 80. Components of this second embodiment which are generally similar to corresponding components in the oil removal device 80 of the first embodiment will be given like numerical designations, with a prime (') designation distinguishing those of the second embodiment.

Thus, there is a head roll 42' which engages the oil recovery belt 40'. There is a rotary connection 144 at one end of the roll 42' which communicates through a pipe 146 to a source of a compressed gaseous medium, such as steam, which source is indicated schematically at 148. There is a plurality of small holes 150 about the entire circumference of the roll 42'.

Enclosing the entire head roll 42' is a box-like structure 152 which has two slot-like openings 154 and 156 to accommodate the travel of, respectively, the upper belt run 40a' and the lower belt run 40b'. Also, there is a sealing plate 158 which fits closely against that portion of the head roll 42' not in contact with the forward belt portion 40c'.

To describe the operation of this second embodiment, the oil absorbing belt 40' functions in substantially the same manner as in the previous embodiment. The belt portion 40c' that comes into contact with the head roll 42' carries the oil collected by the belt 40' on the downward and rearward belt run 40b'. The pressurized steam flowing through the pipe 146 and through the rotary connection 144 into the interior of the head roll 44' passes outwardly at a reasonably high velocity through the multitude of holes 150 and through the forward belt portion 40c'. This causes the oil collected in the belt 40' to be blown from the forward belt portion 40c' into the interior of the enclosure 152. This oil so removed from the forward belt portion 40c' flows downwardly in the enclosure 152 to be removed by a pipe indicated at 160. Additionally, two squeeze rolls 162 are provided to remove oil in the belt 40' not removed by the blowing action of the pressurized steam. In the event that the apparatus is operating in freezing or near freezing temperatures, the action of the steam passing through the belt tends to keep the belt 40' free of ice so that it can properly perform its oil recovery function.

Figure 8:
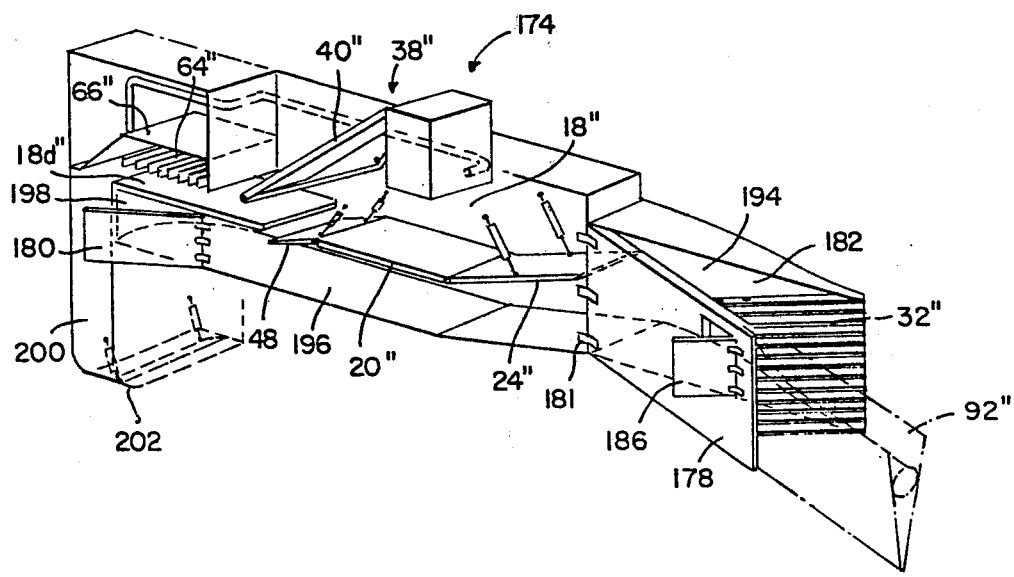
FIG. 8 is an isometric view of one of the oil recovery devices of the apparatus of FIG. 7, with wall portions thereof removed for convenience of illustration.

A third embodiment of the present invention is illustrated in FIGS. 7 through 11, wherein a pair of oil removal devices are incorporated in a patrol vessel. Components in this third embodiment similar to components of the first embodiment will be given like numerical designations with a double prime ('') designation distinguishing those of the third embodiment. The vessel 170 comprises a hull 172 of more or less conventional design, with a pointed bow 173 and side walls 176 for effective travel at cruising speeds through a body of water. A pair of oil recovery devices 174 are mounted each on opposite sides of the hull 172 at approximately the center of the lengthwise dimension of the hull 170. Since the oil recovery devices 174 are substantially mirror images of each other, only the port side oil recovery device 174 will be described herein.

The oil recovery device 174 is mounted just inside the hull side wall 176 at the approximate water line thereof, and is provided with a forward access door 178 and a rear discharge door 180. The forward door 178 is pivotally mounted to the wall 176 at 181 about its rear vertical edge so that it is able to swing outwardly to the right to provide a front inlet opening 182, which is close to the center of floatation of the vessel 170 for proper inflow of the oil polluted water during pitching movement of the vessel 170. A suitable actuating linkage 184 is provided to move the door 178 between its open and closed position. A trash rack 32" is positioned across the inlet 182 and extends from the hull side wall 176 at a rearward and outward slant. Just forwardly of the trash rack 32", the door 178 is provided with a smaller trash door 186 which is moved between its open and closed position by means of a hydraulic jack 188. When there is an excessive accumulation of floating debris against the trash rack 32", the auxiliary trash door 186 can be opened to permit the accumulated debris to pass rearwardly from the trash rack 32". A pair of collecting booms 92" are secured one to each of the front edges of the doors 178 to concentrate the oil polluted surface layer and direct it into the two passageways 182 of the two oil recovery devices 174.

Positioned laterally inwardly from the hull side wall 176 is an interior vertical wall 190 generally parallel to the wall 176. A bottom wall 192 extends between the lower edge of the wall 190 to connect to the hull wall 176. The two vertical walls 176 and 190 and the bottom wall 192 collectively define a main flow passage 194 of substantial depth, so that not only the polluted surface layer 96" passes into the passageway 194, but also a substantial portion of the body of water 94" lying below the polluted layer 96". Positioned between parallel portions of the walls 176 and 190 at about the mid-height of the passageway 194 or moderately above the mid-height of passageway 194 are the main operating components of the oil recovery device 174.

As in the first embodiment, there is a bow ramp 24" pivotally mounted to bottom wall 20", a first stage oil recovery device 38" having an oil absorbing belt 40", a second oil recovery area 64" and a weir 66". The bottom wall 20" is spaced upwardly from the bottom wall 192 to divide the passageway 194 into an upper flow through passage 18" and a lower passageway portion 196. As in the first embodiment, the bottom wall 20" is provided with a main opening 46" and a main gill door 48". In operation, this permits flow of a lower level of water 94a" through the bottom opening 46" into the lower passageway portion 196. The lower passageway portion 196 opens to a rear exit opening 198 formed in the hull side wall 176. This exit opening 198 is selectively closed by the aforementioned rear door 180 through an actuating jack 199.

As in the first embodiment, there is an oil recovery passageway portion 18d" positioned above the rear bottom wall portion 20b". At the rear end of the passageway portion 18d", there is a vertically aligned box-like enclosure 200 which leads to a bottom opening 202 at the level of the lower wall 204 of the hull 172 of the vessel 170. Located at the opening 202 is a rear gill door 54" which opens to the body of water below the vessel wall 204.

To describe the operation of this second embodiment, in cruise conditions the two sets of doors 178 and 180 are closed and the vessel 170 is able to travel through the water 94" without encountering the drag created by water flowing through the passageways 194. Further, the positioning of the oil recovery devices at the sides of the vessel 170 permits the hull 172 to be shaped in a more or less conventional configuration to keep drag to a minimum. When an oil spill is encountered, the oil booms 92" are deployed. (This can conveniently be accomplished by using two small boom boats which are ordinarily carried on the deck of the vessel 170.) As the oil polluted surface layer 96" is directed through the inlet 182, the method of oil removal is quite similar to that described in the first embodiment.

That is to say, with each recovery device 174, the bow ramp 24" is adjusted so that its front edge 28" is at the lower level of the oil polluted layer 96". The first stage oil recovery device 38" with its continuously rotating oil absorbing belt 40" functions as in the first embodiment, and the main gill door 48" is open to a properly adjusted position to divert the lower oil free water portion 94a" through the bottom opening 96" into the lower passageway portion 196.

Rearwardly of the first oil recovery area, the remaining oil polluted liquid flows through the rear passageway portion 18d", with oil collecting in the enclosure area 64". The water passing from the rear passageway portion 18d" passes downwardly through a vertical passageway 206 defined by the structure 200 to pass out the bottom opening 202. The water which passes below the bow ramp 24" flows through the lower passageway section 196 and exits through the rear opening 198.

In FIG. 11, there is shown two relatively large storage reservoirs 208 positioned in the vessel 170 between the two oil recovery devices 174. Oil collected from the first and second recovery areas is pumped into these large reservoirs 208. The bottom wall 204 of the hull 172 is provided with bottom openings 210 leading from the reservoirs 208 so that as oil separates by floatation to form in an upper area 212 in the reservoir 208, the water 214 forms in the bottom portion and passes downwardly through the openings 210.

What is claimed is:
1. A method of collecting oil from a surface of a body of water, said method comprising:
   a. moving an oil absorptive belt into contact with an oil polluted surface layer on said body of water to collect oil in said belt from said surface layer,
   b. passing said belt over a roll having a curved circumferential contact surface over which the belt is arranged to travel in an arcuate path,
   c. engaging the oil absorbing belt with a foraminous squeeze belt having a contact surface which engages the recovery belt along its arcuate path of travel around said roll,
   d. moving said squeeze belt along a closed path and engaging said oil recovery belt with adequate pressure to cause oil in the oil absorptive belt to pass from the oil absorptive belt through the squeeze belt, and
   e. collecting the oil removed from the oil absorptive belt.
2. An oil recovery apparatus comprising:
   a. a hull arranged to be positioned on a body of water to collect oil from a surface of said body of water,
   b. an oil absorptive belt mounted to said hull, and constructed and arranged to travel in an endless path into contact with the surface of the body of water,
   c. a roll having a curved circumferential contact surface over which said oil absorptive belt is arranged to travel in an arcuate path,
   d. a foraminous squeeze belt having a contact surface which engages said oil absorptive belt along its arcuate path of travel, with the portion of the oil absorptive belt traveling said arcuate path being located between said roll contact surface and an arcuate squeeze portion of said squeeze belt,
   e. means to move said oil absorptive belt and said squeeze belt along closed paths, with the engaging portions of the belts traveling with each other, and to press the squeeze portion of the squeeze belt against that portion of the recovery belt that travels said arcuate path, with adequate pressure so that a substantial portion of collected oil in the oil absorptive belt passes from the oil absorptive belt and through the squeeze belt, and f. means to collect the oil that is removed from the oil absorptive belt.

* * * * *